United States Patent
Novak

(10) Patent No.: US 7,071,968 B2
(45) Date of Patent: Jul. 4, 2006

(54) SYSTEM AND METHOD FOR A SOFTWARE STEERABLE WEB CAMERA WITH MULTIPLE IMAGE SUBSET CAPTURE

(75) Inventor: Robert E. Novak, Kirkland, WA (US)

(73) Assignee: Digeo, Inc., Kirkland, WA (US)

( * ) Notice: Subject to any disclaimer, the term of this patent is extended or adjusted under 35 U.S.C. 154(b) by 718 days.

(21) Appl. No.: 09/923,820

(22) Filed: Aug. 6, 2001

(65) Prior Publication Data
US 2002/0141658 A1    Oct. 3, 2002

Related U.S. Application Data

(63) Continuation-in-part of application No. 09/823,804, filed on Mar. 30, 2001, now abandoned.

(51) Int. Cl.
H04N 5/225    (2006.01)
H04N 5/232    (2006.01)

(52) U.S. Cl. .................. 348/207.1; 348/211.9
(58) Field of Classification Search ............. 348/207.1, 348/211.9
See application file for complete search history.

(56) References Cited

U.S. PATENT DOCUMENTS

| | | |
|---|---|---|
| 4,310,222 A | 1/1982 | Ikemori |
| 4,772,107 A | 9/1988 | Friedman |
| 4,831,438 A | 5/1989 | Bellman, Jr. et al. ........ 358/108 |
| 5,128,776 A | 7/1992 | Scorse et al. ................ 358/426 |
| 5,353,392 A | 10/1994 | Luquet et al. .............. 395/135 |
| 5,359,363 A | 10/1994 | Kuban et al. ................. 348/36 |
| 5,444,478 A | 8/1995 | Lelong et al. ................ 348/39 |
| 5,606,364 A | 2/1997 | Kim ............................ 348/159 |
| 5,657,073 A | 8/1997 | Henley ......................... 348/38 |
| 5,877,821 A | 3/1999 | Newlin et al. .............. 348/724 |
| 6,011,558 A | 1/2000 | Hsieh et al. ................. 345/435 |
| 6,031,540 A | 2/2000 | Golin et al. |
| 6,052,509 A | 4/2000 | Abe ............................. 386/117 |
| 6,144,773 A | 11/2000 | Kolarov et al. |
| 6,172,707 B1 | 1/2001 | Ouchi et al. ................. 348/208 |

(Continued)

FOREIGN PATENT DOCUMENTS

WO    WO PCT/US99/02122 A1    2/2000

OTHER PUBLICATIONS

Ken Turkowski, Making Environment Maps From Fisheye Photographs, [online], [retrieved on Oct. 10, 2001]. Retrieved from the Internet: <URL:http://www.iqtvra.org./Defish/Fisheye.html>.

(Continued)

Primary Examiner—Ngoc-Yen Vu
Assistant Examiner—James M. Hannett
(74) Attorney, Agent, or Firm—Kory D. Christensen; Stoel Rives LLP

(57) ABSTRACT

An apparatus for controlling the capture of an image of an object, includes: a lens capable to capture a scene within a wide field of vision of the lens; an image collection array communicatively coupled to the lens and capable to store data of the scene within the wide field of vision; a memory communicatively coupled to the image collection array and capable to store digitized data of the scene within the wide field of vision; and a processing stage communicatively coupled to the memory and capable to select a plurality of subsets of the digitized data of the scene in order to generate an image of the captured scene.

22 Claims, 18 Drawing Sheets

U.S. PATENT DOCUMENTS

| | | | | |
|---|---|---|---|---|
| 6,223,213 | B1 | 4/2001 | Cleron et al. | 709/206 |
| 6,297,846 | B1* | 10/2001 | Edanami | 348/239 |
| 6,308,015 | B1 | 10/2001 | Matsumoto | 396/106 |
| 6,366,311 | B1 | 4/2002 | Monroe | 348/148 |
| 6,470,498 | B1* | 10/2002 | Reber et al. | 725/139 |
| 6,507,366 | B1* | 1/2003 | Lee | 348/352 |
| 6,543,052 | B1 | 4/2003 | Ogasawara | 725/60 |
| 6,567,121 | B1* | 5/2003 | Kuno | 348/211.3 |
| 6,606,422 | B1* | 8/2003 | Dulin et al. | 382/282 |
| 6,727,940 | B1* | 4/2004 | Oka et al. | 348/211.3 |
| 2001/0019355 | A1 | 9/2001 | Koyanagi et al. | 348/36 |
| 2003/0025803 | A1* | 2/2003 | Nakamura et al. | 348/218.1 |

OTHER PUBLICATIONS

Welcome To BeHere.com. Webpage [online]. BeHere Technologies, 2001 [retrieved on Oct. 10, 2001], Retrieved from the Internet:<URL:http://www.BeHere.com/1.html>.

Leegomes, BeHere takes a 360-degree Turn In Imaging. Press Releases [online], [retrieved on Oct. 11, 2001]. Retrieved from the Internet:<URL:http://www.BeHere.com/news_press_031501.html>.

Products. Webpage [online]. SPheron VR, 2000 [retrieved on Oct. 10, 2001]. Retrieved from the Internet:<URL:http://www.Spheron.com/products/products_portal.html>.

Panoscan Home. Panoscan offers a choice of new cameras! Webpage [online]. Panoscan, Inc., 2001 [retrieved on Oct. 10, 2001]. Retrieved from the Internet:<URL:http://www.panoscan.com>.

Internet monitoring, live streaming video, and webcam software from Surveyor Corporation. Webpage [online]. Surveyor Corporation, 2001 [retrieved on Oct. 11, 2001]. Retrieved from the Internet: <URL:http://www.surveyorcorp.com/products/products_info.html>.

Robotic Camera Mounts Info, Transit RCM. Webpage [online]. Surveyor Corporation, 2001 [retrieved on Oct. 10, 2001]. Retrieved from the Internet:<URL:http://www.surveyorcorp.com/products/transit/rcm_info.html>.

Product Selector, Product Overview/Selector. Webpage [online]. Surveyor Corporation, 2001. [retrieved on Oct. 10, 2001]. Retrieved from the Internet:<URL:http://www.dazzle.com/products/select_gut.html>.

Company News. IMove granted new patent for panoramic Imaging: The patent extends iMove's intellectual property in panoramic Image seaming. Webpage [online]. IMove Incorporated, Mar. 25, 2000 [retrieved on Mar. 26, 2000], Retrieved from the Internet:<URL:http://www.smoothmove.com/01company_info/.html>.

* cited by examiner

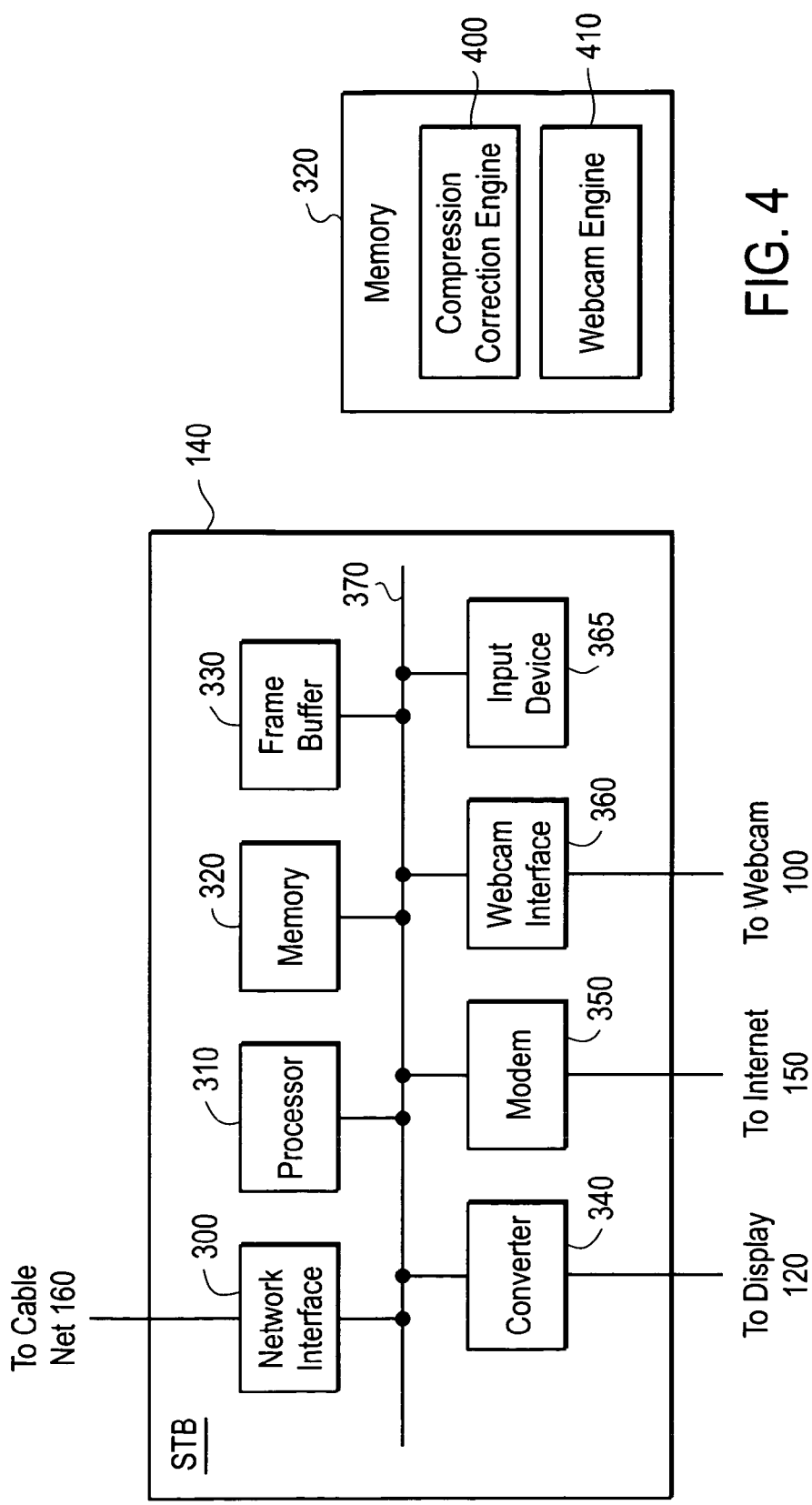

SYSTEM AND METHOD FOR A SOFTWARE STEERABLE WEB CAMERA WITH MULTIPLE IMAGE SUBSET CAPTURE

CROSS-REFERENCE TO RELATED APPLICATIONS

This application is a continuation-in-part of U.S. application Ser. No. 09/823,804, by common inventor Robert Novak, filed Mar. 30, 2001 now abandoned, and entitled "SYSTEM AND METHOD FOR A SOFTWARE STEERABLE WEB CAMERA". application Ser. No. 09/823,804 is fully incorporated herein by reference.

TECHNICAL FIELD

This disclosure relates generally to digital imaging, digital video or web cameras, and more particularly but not exclusively, to systems and methods for capturing camera images by use of software control.

BACKGROUND

Conventional digital imaging, digital video or web cameras ("webcams") can be used for teleconferencing, surveillance, and other purposes. One of the problems with conventional webcams is that they have a very restricted field of vision. This restricted vision field is due to the limitations in the mechanism used to control the webcam and in the optics and other components in the webcam.

In order to increase the vision field of a webcam, the user might manually control the webcam to pan and/or tilt in various directions (e.g., side-to-side or up-and-down) and/or to zoom in or away from an image to be captured. However, this manual technique is inconvenient, as it requires the user to stop whatever he/she is doing, to readjust the webcam, and to then resume his/her previous activity.

Various other schemes have been proposed to increase the webcam vision field, such as adding complex lens assemblies and stepper motors to the webcams to permit the camera to perform the pan and zoom functions. However, complex lens assemblies are expensive and will make webcams unaffordable for many consumers. Additionally, stepper motors use moving or mechanical parts that may fail after a certain amount of time, thus requiring expensive repairs or the need to purchase a new webcam. Stepper motors may also disadvantageously suffer from hysterisis, in which repeated pan, tilt or zooming operations lead to slightly inconsistent settings during each operation.

Furthermore, repairs for webcams on set top boxes (STBs) are particularly expensive because of the required service call for repairing the STB webcam.

Accordingly, there is need for a new system and method to allow webcams to increase their vision field. There is also a need for a new system and method to permit webcams to perform particular operations, such as panning, tilting, and/or zooming, without using stepper motors or requiring the user to physically adjust the webcam.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3 is a block diagram of an embodiment of the set top box of FIG. 1.

FIG. 4 is a block diagram of one example of a memory device of the set top box.

DETAILED DESCRIPTION OF THE ILLUSTRATED EMBODIMENTS

Figure 1:
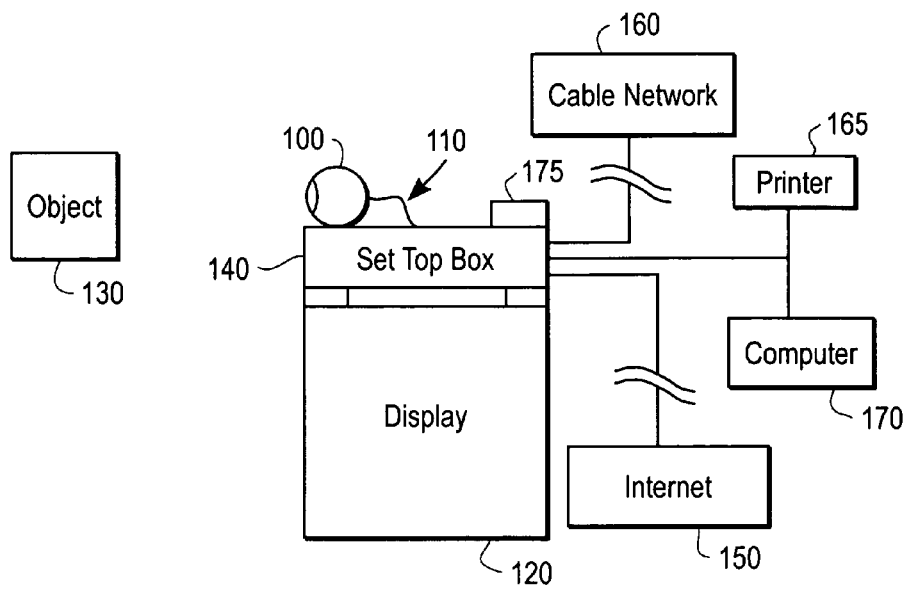
FIG. 1 is a block diagram showing a webcam coupled to a set top box according to an embodiment of the invention.

Embodiments of a system and method for a software steerable camera are disclosed herein. As an overview, an embodiment of the invention provides a system and method that capture camera images by use of software control. As an example, the camera may be web camera or other types of camera that can support a wide angle lens. The wide angle lens is used to capture a scene or image in the wide field of vision. The captured scene or image data is then stored in an image collection array and then digitized and stored in memory. In one embodiment, the image collection array is a relatively larger sized array to permit the array to store image data from the wide vision field. Processing is performed for user commands to effectively pan or tilt the webcam in particular directions and/or to zoom the webcam toward or away from an object to be captured as an image. However, instead of physically moving the webcam in response to the user commands, a particular subset of the digitized data is selected and processed so that selected subset data provides a simulated panning, tilting, and/or zooming of the image of the captured object. A compression/correction engine can then compensate the selected subset data for distortion and compress the selected subset data for transmission.

In another embodiment, a plurality of subsets in the digitized data are selected and processed prior to transmitting the data subsets to a destination device. Particular subsets may be overlapping or non-overlapping in the digitized data. A motion detector may, for example, be used to determine the location of at least one of the data subsets. This embodiment may permit a single camera to simulate multiple virtual cameras, since images from multiple focus areas can be serially captured and integrated into a single, integrated output image.

The invention advantageously permits a camera, such as a webcam, to have a wide vision field. The invention may also advantageously provide a wide vision field for cameras that have short depth fields. The invention also advantageously avoids the use of stepper motors to obtain particular images based on pan and zoom commands from the user.

In the description herein, numerous specific details are provided, such as the description of system components in FIGS. 1 through 20, to provide a thorough understanding of embodiments of the invention. One skilled in the relevant art will recognize, however, that the invention can be practiced without one or more of the specific details, or with other methods, components, materials, parts, and the like. In other instances, well-known structures, materials, or operations are not shown or described in detail to avoid obscuring aspects of the invention.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

FIG. 1 is a block diagram showing a webcam 100 coupled to a set top box ("STB") 140 according to an embodiment of the invention. The webcam 100 can capture an image of an object 130 that is in the webcam field of vision. Webcam 100 is coupled to STB 140 via, for example, a cable 110. Webcam 100 may also be coupled to STB 140 by use of other suitable connections or methods, such as IR beams, radio signals, suitable wireless transmission techniques, and the like. Typically, STB 140 is coupled to a cable network 160 and receives TV broadcasts, as well as other data, from the cable network 160. Typically, STB 140 is also coupled to the Internet 150 or other networks for sending and receiving data. Data received from the Internet 150 or cable network 160 may be displayed on a display 120. STB 140 may also transmit images that are captured by the webcam 100 to other computers via the Internet 150. STB may also transmit the captured webcam images to a printer 165 and/or to other devices 170 such as a computer in a local area network.

It is noted that embodiments of the invention may also be implemented in other types of suitable cameras that can support a wide angle lens. For example, an embodiment of the invention may be implemented in, for example, security cameras, ATM cash machine cameras, spy cameras, portable cameras, or pin-hole type cameras. It is further noted that the invention is not limited to the use of STB 140. Other processing device may be used according to embodiments of the invention to perform image distortion compensation, image compression, and/or other functions that will be described below.

Figure 2:
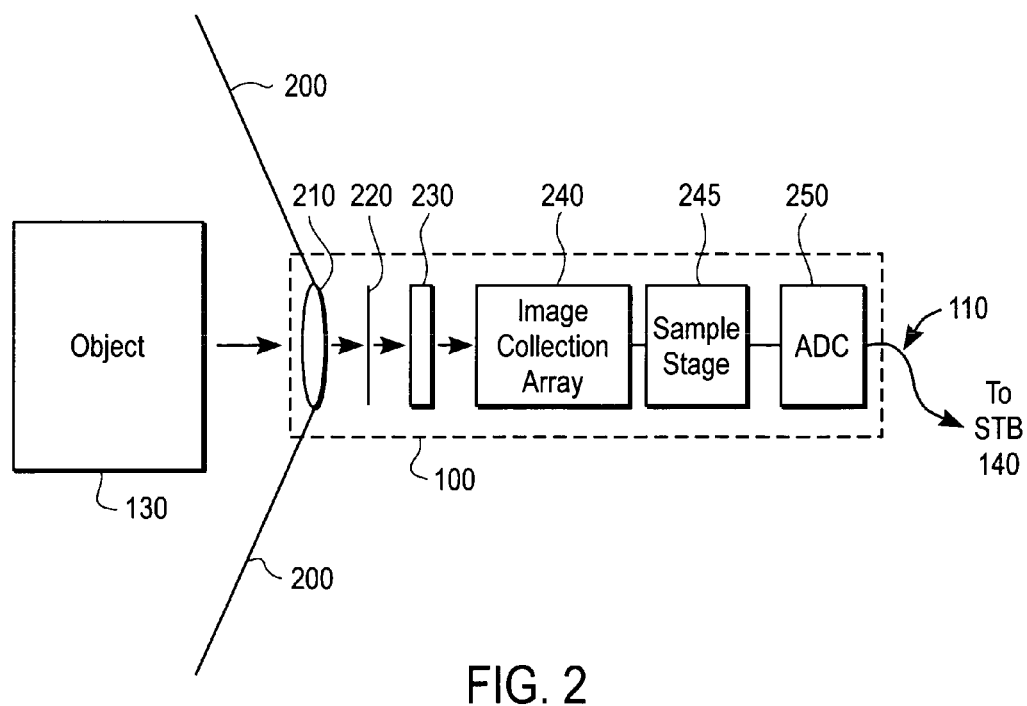
FIG. 2 is a block diagram of an embodiment of the webcam of FIG. 1.

FIG. 2 is a block diagram of an embodiment of the webcam 100 of FIG. 1. Webcam 100 comprises a lens 210; a shutter 220; a filter 230; an image collection array 240; a sample stage 245; and an analog to digital converter ("ADC") 250. The lens 210 may be a wide angle lens, such as a fish-eye lens, that has angular field of, for example, at least about 140 degrees, as indicated by lines 200. Using a wide-angle lens allows webcam 100 to capture a larger image area than a conventional webcam. Shutter 220 opens and closes at a pre-specified rate, allowing light into the interior of webcam 100 and onto a filter 230. Filter 230 allows for image collection array 240 to capture different colors of an image and may include a static filter, such as a Bayer filter, or may include a spinning disk filter. In another embodiment, the filter may be replaced with a beam splitter or other color differentiation device. In another embodiment, webcam 100 does not include a filter or other color differentiation device.

In one embodiment, the image collection array 240 can include charge coupled device ("CCD") sensors or complementary metal oxide semiconductor ("CMOS") sensors, which are generally much less expensive than CCD sensors but may be more susceptible to noise. Other types of sensors may be used in the image collection array 240. The size of the image collection array 240 is relatively larger in size such as, for example, 1024 by 768, 1200 by 768, or 2000 by 1000 sensors. The large sized array permits the array 240 to capture images in the wide vision field 200 that is viewed by the webcam 200.

A sample stage 245 reads the image data from the image collection array 240 when shutter 220 is closed, and an analog-to-digital converter (ADC) 250 converts the image data from an analog to digital form, and feeds the digitized image data to STB 140 via cable 110 for processing and/or transmission. In an alternative embodiment, the image data may be processed entirely by components of the webcam 100 and transmitted from webcam 100 to other devices such as the printer 165 or computer 170.

For purposes of explaining the functionality of embodiments of the invention, other conventional components that are included in the webcam 100 have been omitted in the figures and are not discussed herein.

FIG. 3 is a block diagram of an embodiment of the set top box (STB) 140. STB 140 includes a network interface 300; a processor 310; a memory device 320; a frame buffer 330; a converter 340; a modem 350; a webcam interface 360, and an input device 365, all interconnected for communication by system bus 370. Network interface 300 connects the STB 140 to the cable network 160 (FIG. 1) to receive videocasts from the cable network 160. In alternative embodiments, the modem 350 or converter 340 may provide some or all of the functionality of the network interface 300.

Processor 310 executes instructions stored in memory 320, which will be discussed in further detail in conjunction with FIG. 4. Frame buffer 330 holds preprocessed data received from webcam 100 via webcam interface 360. In another embodiment, the frame buffer 330 is omitted since the data from webcam 100 may be loaded into memory 320 instead of loading the data into the frame buffer 330.

Converter 340 can convert, if necessary, digitally encoded broadcasts to a format usable by display 120 (FIG. 1). Modem 350 may be a conventional modem for communicating with the Internet 150 via a publicly switched telephone network. The modem 350 can transmit and receive digital information, such as television scheduling information, the webcam 100 output images, or other information to Internet 150. Alternatively, modem 350 may be a cable modem or a wireless modem for sending and receiving data from the Internet 150 or other network.

Webcam interface 360 is coupled to webcam 100 and receives image output from the webcam 100. Webcam interface 360 may include, for example, a universal serial bus (USB) port, a parallel port, an infrared (IR) receiver, or other suitable device for receiving data. Input device 365 may include, for example, a keyboard, mouse, joystick, or other device or combination of devices that a user (local or remote) uses to control the pan, tilt, and/or zoom webcam 100 by use of software control according to embodiments of the invention. Alternatively, input device 365 may include a wireless device, such an infrared IR remote control device that is separate from the STB 140. In this particular alternative embodiment, the STB 140 also may include an IR receiver coupled to the system bus 370 to receive IR signals from the remote control input device.

The components shown in FIG. 3 may be configured in other ways and in addition, the components may also be integrated. Thus, the configuration of the STB 140 in FIG. 3 is not intended to be limiting.

FIG. 4 is a block diagram of an example of a memory device 320 of the set top box 140. Memory device 320 may be, for example, a hard drive, a disk drive, random access memory ("RAM"), read only memory ("ROM"), flash memory, or any other suitable memory device, or any combination thereof. Memory device 320 stores, for example, a compression/correction engine 400 that performs compression and distortion compensation on the image data received from webcam 100. Memory device 320 also stores, for example, a webcam engine 410 that accepts and process user commands relating to the pan, tilt, and/or zoom functions of the webcam 100, as described below. It is also noted the compression/correction engine 400 and/or the webcam engine 410 may be stored in other storage areas that are accessible by the processor 310. Furthermore, the compression/correction engine 400 and/or the webcam engine 410 and/or a suitable processor for executing software may be stored in the webcam 100. It is noted that either one of the compression/correction engine 400 or webcam engine 410 may be implemented, for example, as a program, module, instruction, or the like.

Compression/correction engine 400 uses, for example, any known suitable skew correction algorithm that compresses a subset of the image output from webcam 100 and that compensates the subset image output for distortion. The distortion compensation of the subset image output may be performed before the compression of the subset image output. In another embodiment, the distortion is automatically corrected in the subset image output when performing the compression of the subset image output, and this leads to a saving in processor resource.

Webcam engine 410 accepts input from a user including instructions to pan or tilt the webcam 100 in particular directions and/or to zoom the webcam 100 toward or away from an object to be captured as an image.

Figure 5A:
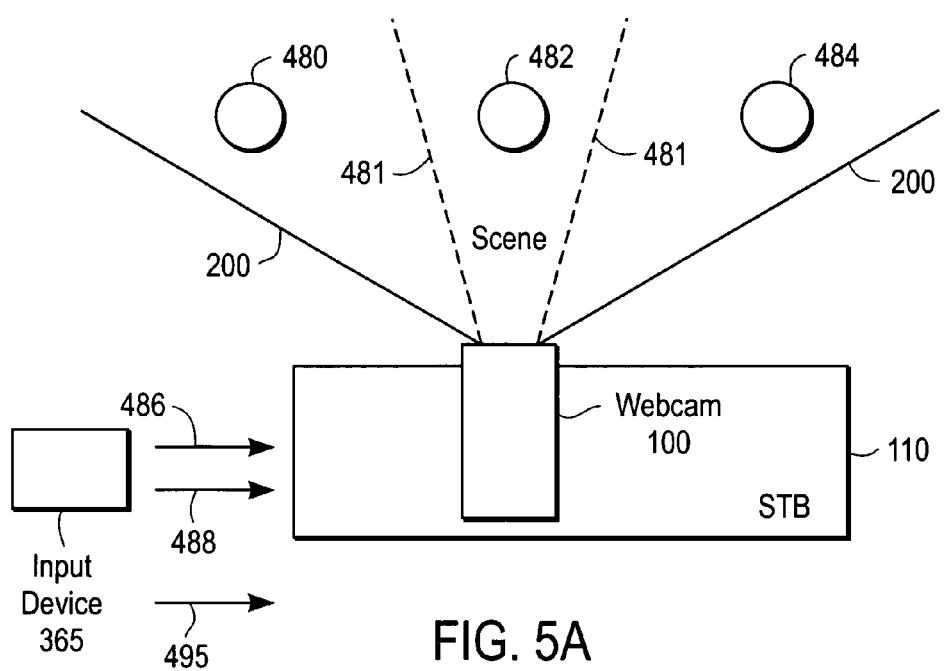
FIG. 5A is an illustrative example block diagram showing a function of the webcam of FIG. 1 in response to particular pan and/or tilt commands.
Figure 5B:
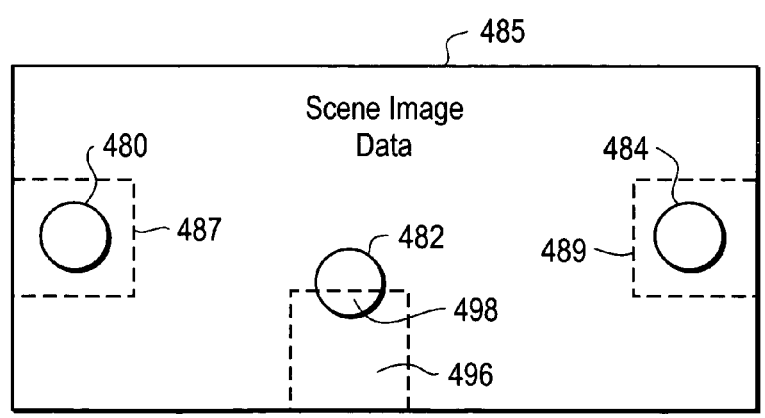
FIG. 5B is an illustrative example block diagram of selected subsets in a digitized scene image data in response to particular pan and/or tilt commands.

FIGS. 5A and 5B illustrate examples of operations of an embodiment of the invention. For example, FIG. 5A is a block diagram illustrating a top view of webcam 100. The vision field 200 of the wide angle lens 210 of webcam 100 captures a wide scene area including the three objects 480, 482, and 484. In contrast, a conventional webcam may only be able to capture the scene area in the limited vision field 481. As a result, a conventional webcam may need manual adjustment or movement by stepper motors to capture the objects 480 or 484 that are outside of the limited vision field 481.

For the webcam 100, the entire scene captured in the vision field 200 is stored as an image in the image collection array 240 (FIG. 2) and processed by sample stage 245 and ADC stage 250, and the image data of the entire scene is stored as digitized scene image data 485 in frame buffer 330 (or memory 320). Thus, each position in the scene area that is covered by vision field 200 corresponds to a position in the image collection array 240 (FIG. 2). The values in the positions in the image collection array 240 are then digitized as values of the digitized scene image data 485.

The webcam engine 410 (FIG. 4) allows a user to select a subset area in the vision field 200 for display or transmission, so as to simulate a panning/tilting feature of conventional webcams that use stepper motors. For example, assume that the digitized image data 485 was captured in response to a user directly or remotely sending a command 486 via input device 365 to pan the webcam 100 to the left in order to permit the capture of an image of the object 480. The webcam engine 410 receives the pan left command 486 and accordingly samples an area 487 that contains an image of the object 480 in the digitized scene image data 485.

As another example, if the user were to send a pan right command 488 to webcam 100, then the webcam engine 410 selects an area (subset) 489 that contains an image of the object 484 in the digitized scene image data 485.

As another example, if the user were to send a tilt down command 495 to webcam 100, then the webcam engine 410 selects a subset 496 that contains an image of the bottom portion 498 of object 484 in the digitized scene image data 485.

Webcam engine 410 then passes a selected area (e.g., selected area 487, 489, 496) to the compression/correction engine 400 (FIG. 4). The compression/correction engine 400 then performs compression operation and distortion compensation. For example, in FIG. 6A, assume that the selected area 487 shows distortions 490 in the image of 480 as a result of using the wide angle lens 210. For images captured by a wide angle lens, the distortions become more pronounced toward the edges of the images. The compression/correction engine 400 can perform distortion compensation to reverse the distortion caused by the wide angle lens 210 on the captured image of object 480. Typically, this compensation is performed by changing the curved surface of an image into a straight surface.

Figure 6A:
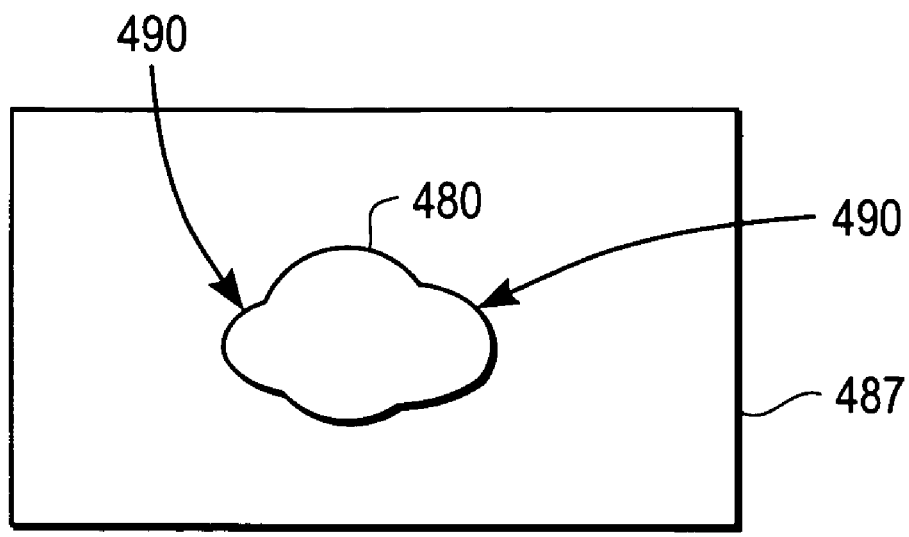
FIG. 6A is an illustrative example block diagram of a selected subset image data with distortions.
Figure 6B:
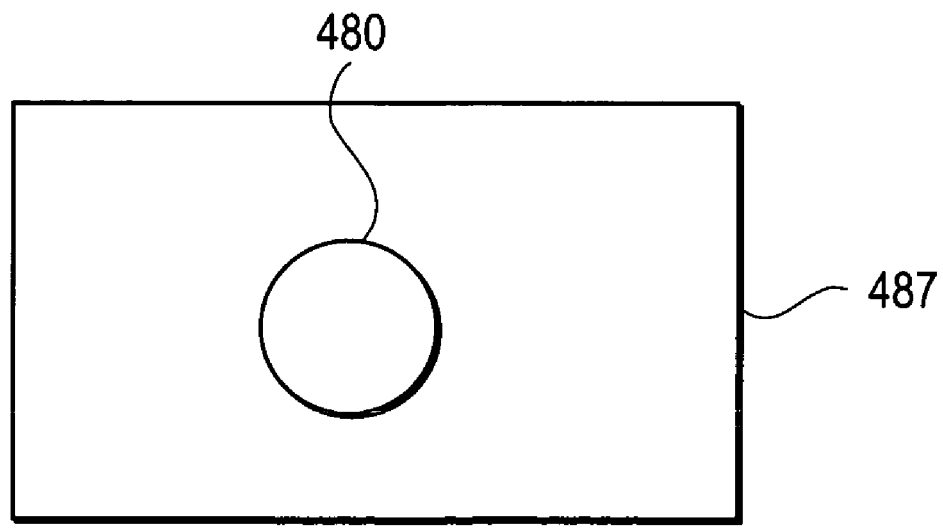
FIG. 6B is an illustrative example block diagram of a selected subset image data that has been distortion compensated.

FIG. 6B shows an image of the object 480 without distortions after applying distortion compensation on the selected area 487. Thus, the image of the object 480 is shown as a normal rectilinear image. The selected area 487 can then be compressed by the compression/correction engine 400. In another embodiment, the compression and distortion compensation for selected area 487 can be performed concurrently. In yet another embodiment, the distortion compensation for selected area 487 can be performed before compression of the selected area 487.

The webcam engine 410 then passes the compressed distortion-compensated selected image data 487 to an output device, such as display 120 (FIG. 1) for viewing, or to the printer 165 or other devices such as computer 170. In addition to or instead of passing the compressed distortion-compensated selected image data 487 to an output device, webcam engine 410 may transmit the data 487 to another device coupled to the Internet 150.

Figure 7:
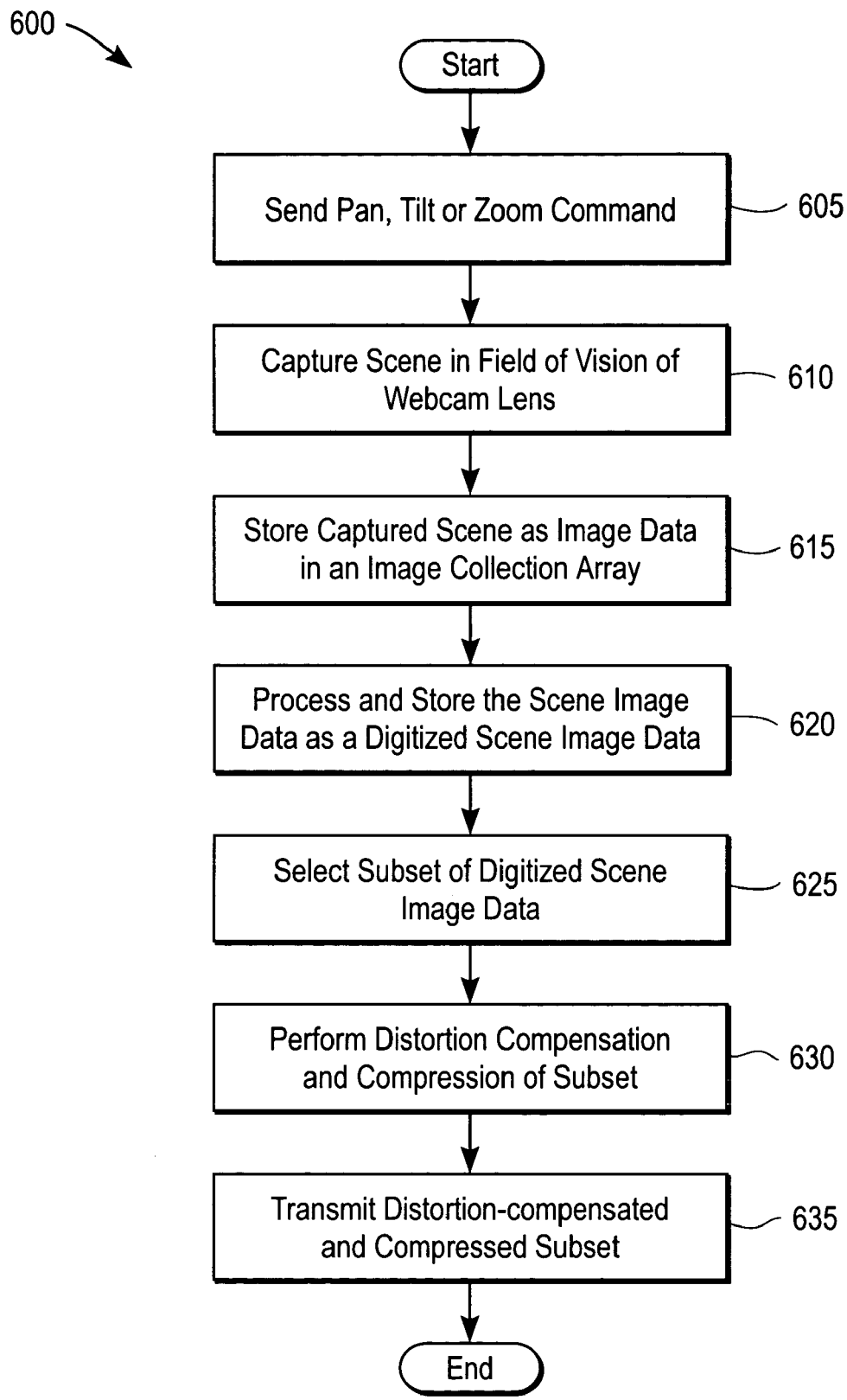
FIG. 7 is a flowchart of a method according to an embodiment of the invention.

FIG. 7 is a flowchart of a method 600 to perform a panning, tilting or zooming function according to an embodiment of the invention. A user first sends (605) a pan/tilt command indicating a direction of an object to be captured in an image by a webcam. A scene in the field of vision of a lens of the webcam is then captured (605). In one embodiment, the captured scene is in the vision field 200 (FIG. 2) of a wide angle lens 210 of the webcam 100. The captured scene in the vision field is then stored (615) as scene image data in an image collection array. The image collection array may, for example, include charge coupled devices or complementary metal oxide semiconductor sensors. The scene image data in the image collection array is then processed and stored (620) as a digitized scene image data. The digitized scene data may be stored in, for example, the frame buffer 330 in the set top box 140 or other processing device. Based on the pan/tilt/zoom command(s), a subset of the digitized scene image data is selected (625). In one embodiment, the webcam engine 410 processes the pan/tilt/zoom command(s) and selects the subset of the digitized scene image data based on the pan/tilt/zoom command(s).

Distortion compensation and compression is then performed (630) on the subset of the digitized scene image data. In one embodiment, the compression/correction engine 400 performs (630) the distortion compensation and compression of the subset of the digitized scene image data. The distortion-compensated and compressed subset is then transmitted (635) to a selected destination such as display 120, to another device via Internet 150 or cable network 160, to printer 165, and/or to computer 170.

Figure 8A:
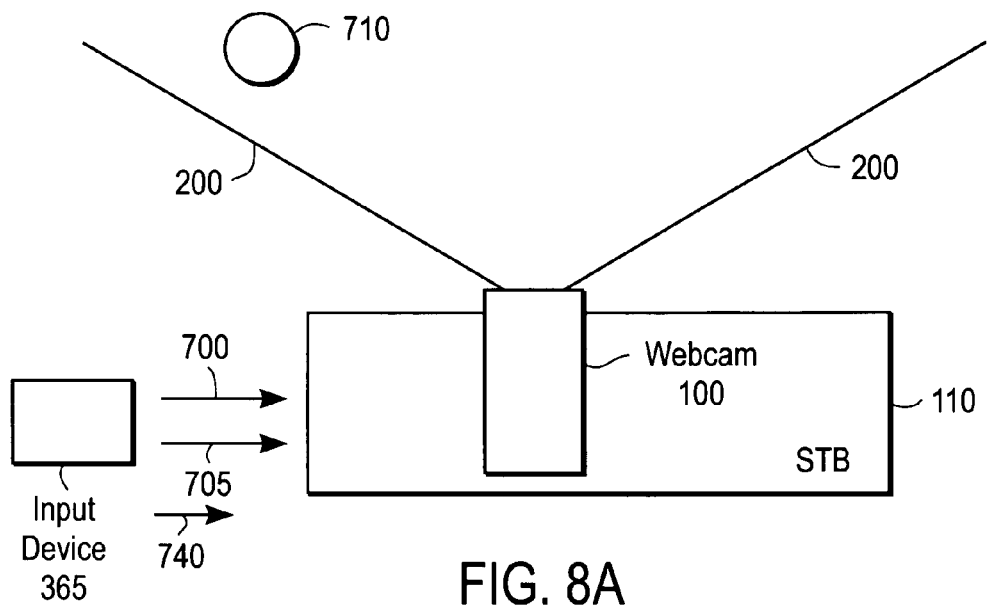
FIG. 8A is an illustrative example block diagram showing a function of the webcam of FIG. 1 in response to particular pan and zoom commands.
Figure 8B:
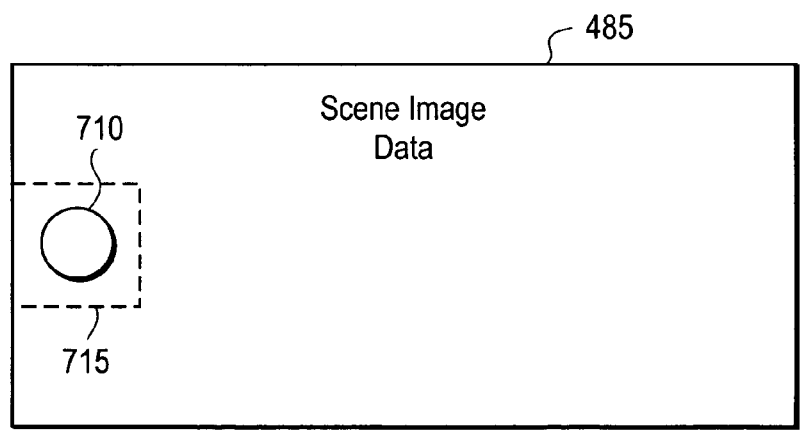
FIG. 8B is an illustrative example block diagram of a selected subset in the digitized scene image data in response to a particular pan command.

FIGS. 8A and 8B illustrate an example of another operation of an embodiment of the invention. Assume the user sends a command 700 in order to capture an image of the object 710 and another command 705 to zoom the image of the object 710. A conventional webcam will require a physical pan movement to the left to capture the image of the object 705 and to capture a zoomed image of the object 705. Assume in this example that the digitized scene image data 485 of the scene in the vision field 200 was captured in the manner described above. The webcam engine 410 receives the pan left command 700 and accordingly selects an area 715 that contains an image of the object 710 in the digitized scene image data 485. The compression/correction engine 400 can perform distortion compensation to reverse the distortion caused by the wide angle lens 210 on the captured image of object 710. Typically, this compensation is performed by changing the curved surface of an image into a straight surface.

Figure 8C:
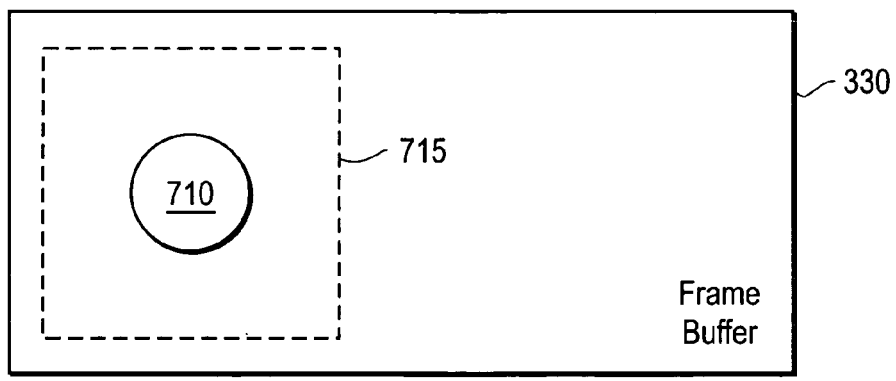
FIG. 8C is an illustrative example block diagram of the selected subset in FIG. 8B in response to a particular zoom command.

Also, as shown in FIG. 8C, in response to the zoom command 705, the webcam engine 410 can enlarge an image of the selected area 715 in, for example, the frame buffer 330. The compression/correction engine 400 can then compress the image of selected area 715 and transmit the compressed image to a destination such as the display 120 or other suitable devices.

Figure 9:
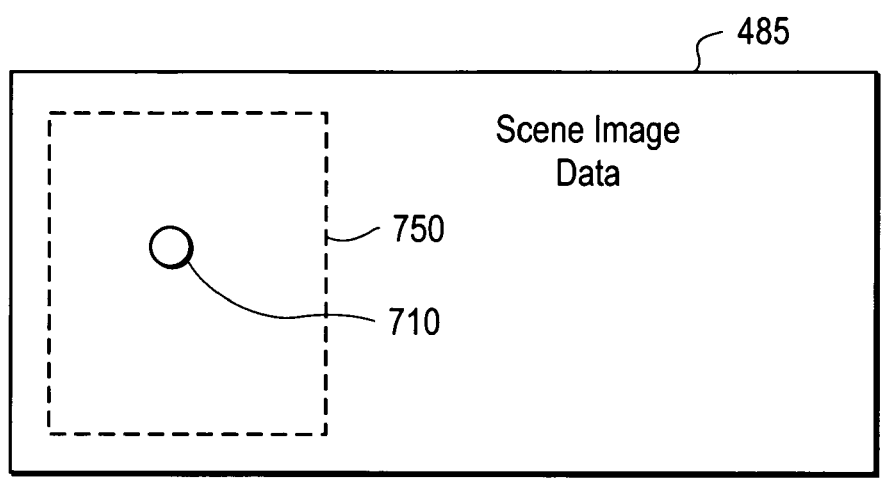
FIG. 9 is an illustrative example block diagram of the selected subset in FIG. 9 in response to another particular zoom command.

Reference is now made to FIGS. 8A and 9 to describe another function according to an embodiment of the invention. Assume the user sends a command 700 in order to capture an image of the object 710 and another command 740 to zoom away from the object 710. The webcam engine 410 receives the pan left command 700 and accordingly selects an area 750 that contains an image of the object 710 in the digitized scene image data 485. However, since the webcam engine 410 also received the zoom away command 740, the selected area 750 will be larger in size and cover a greater selected area portion in the digitized scene image area 485 than the selected area 715 in FIG. 8B.

Figure 10:
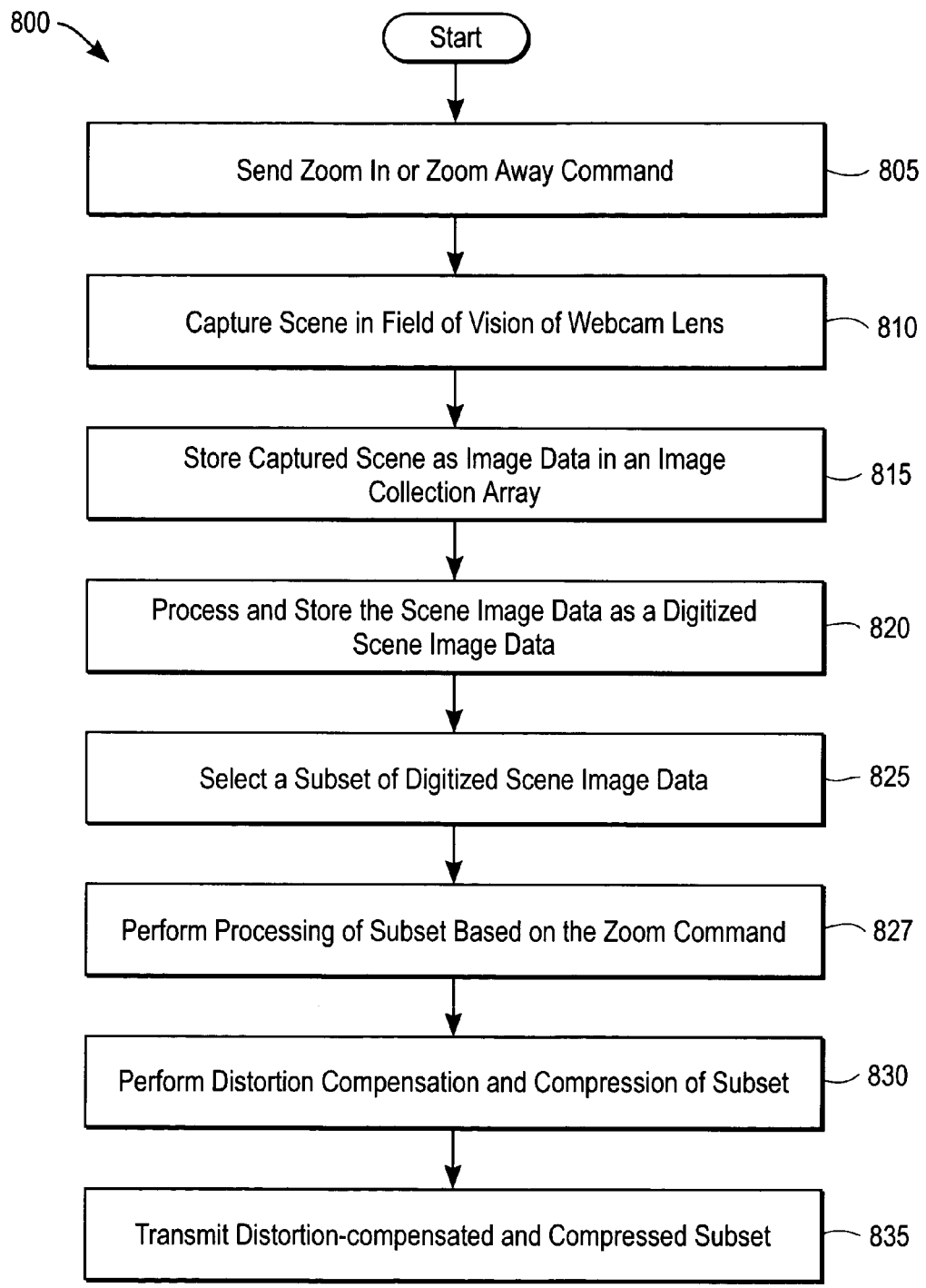
FIG. 10 is a flowchart of a method according to another embodiment of the invention.

FIG. 10 is a flowchart of a method 800 to perform a zooming function according to an embodiment of the invention. A user first sends (805) a zoom command indicating whether to zoom in or away from an object to be captured in an image by a webcam. A scene in the field of vision of the lens of the webcam is then captured (810). The captured scene in the vision field is then stored (815) as scene image data in an image collection array. The scene image data in the image collection array is then processed and stored (820) as a digitized scene image data. Based on the zoom command, a subset of the digitized scene image data is selected (825).

Processing of the subset of the digitized scene image data is then performed (827) based on the zoom command. For example, if the zoom command is for zooming the image of the captured object, then the subset of the digitized scene image data is enlarged. As another example, if the zoom command is for zooming away from the captured object, then the selected subset will cover a greater area in the digitized scene image data.

Distortion compensation and compression are then performed (830) on the subset of the digitized scene image data. The distortion-compensated and compressed subset is then transmitted (835) to a selected destination such as display 120, to another device via Internet 150 or cable network 160, to printer 165, and/or to computer 170.

Figure 11:
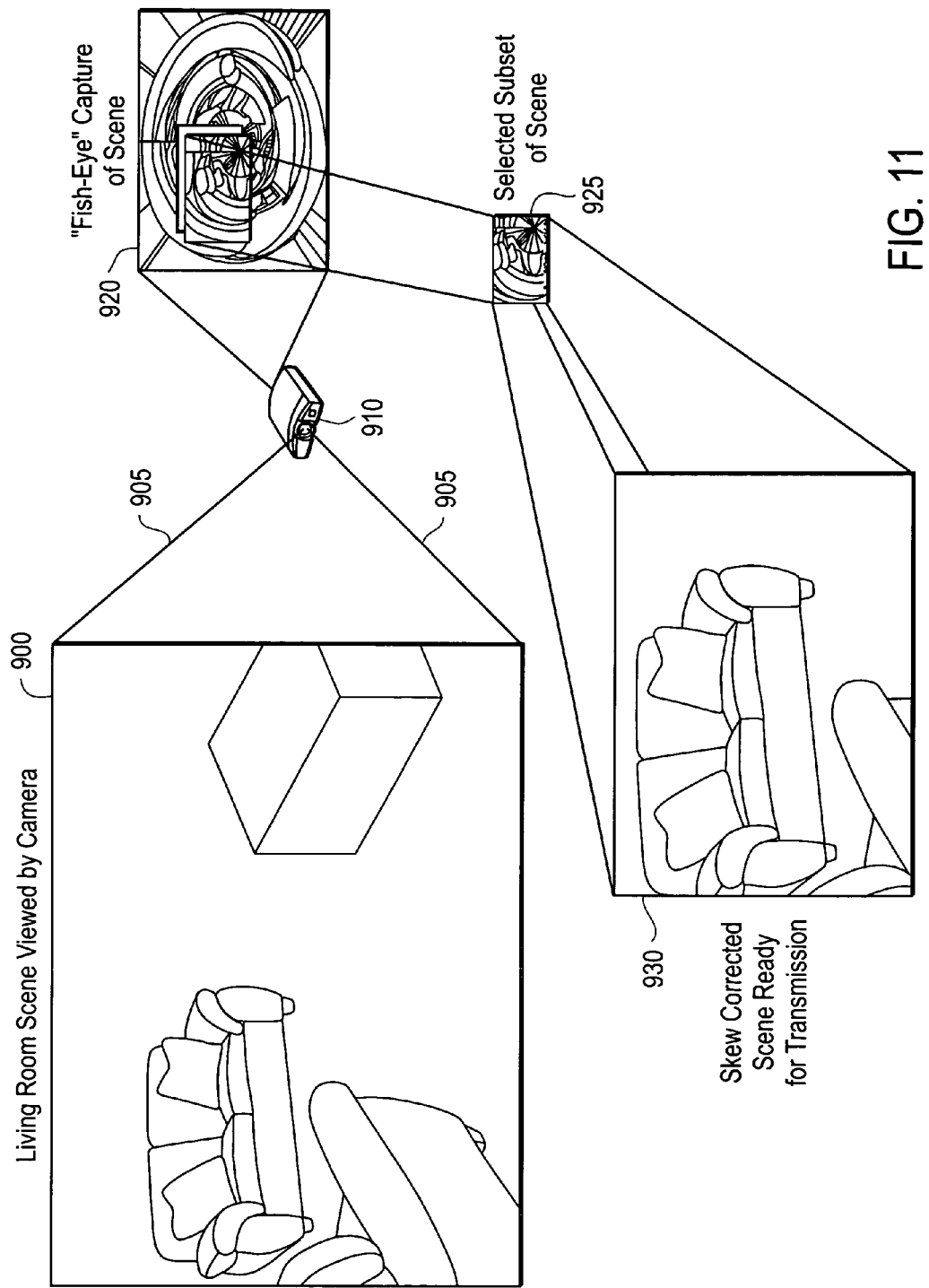
FIG. 11 is another diagram shown to further assist in describing an operation of an embodiment of the invention.

FIG. 11 is another diagram shown to further assist in describing an operation of an embodiment of the invention. A scene 900 falls within the vision field 905 of a wide angle lens 910 of a camera 915. The captured scene is digitized and processed into a digitized scene data 920. A subset 925 of the digitized scene data 920 is selected based on a pan, tilt, and/or zoom command(s) that can be transmitted from an input device by the user. The selected subset 925 may be skew corrected (e.g., distortion compensated) into scene data 930 that can be transmitted to a destination. The scene data 930 is also typically compressed in order to optimize the data transmission across a network.

Figure 12:
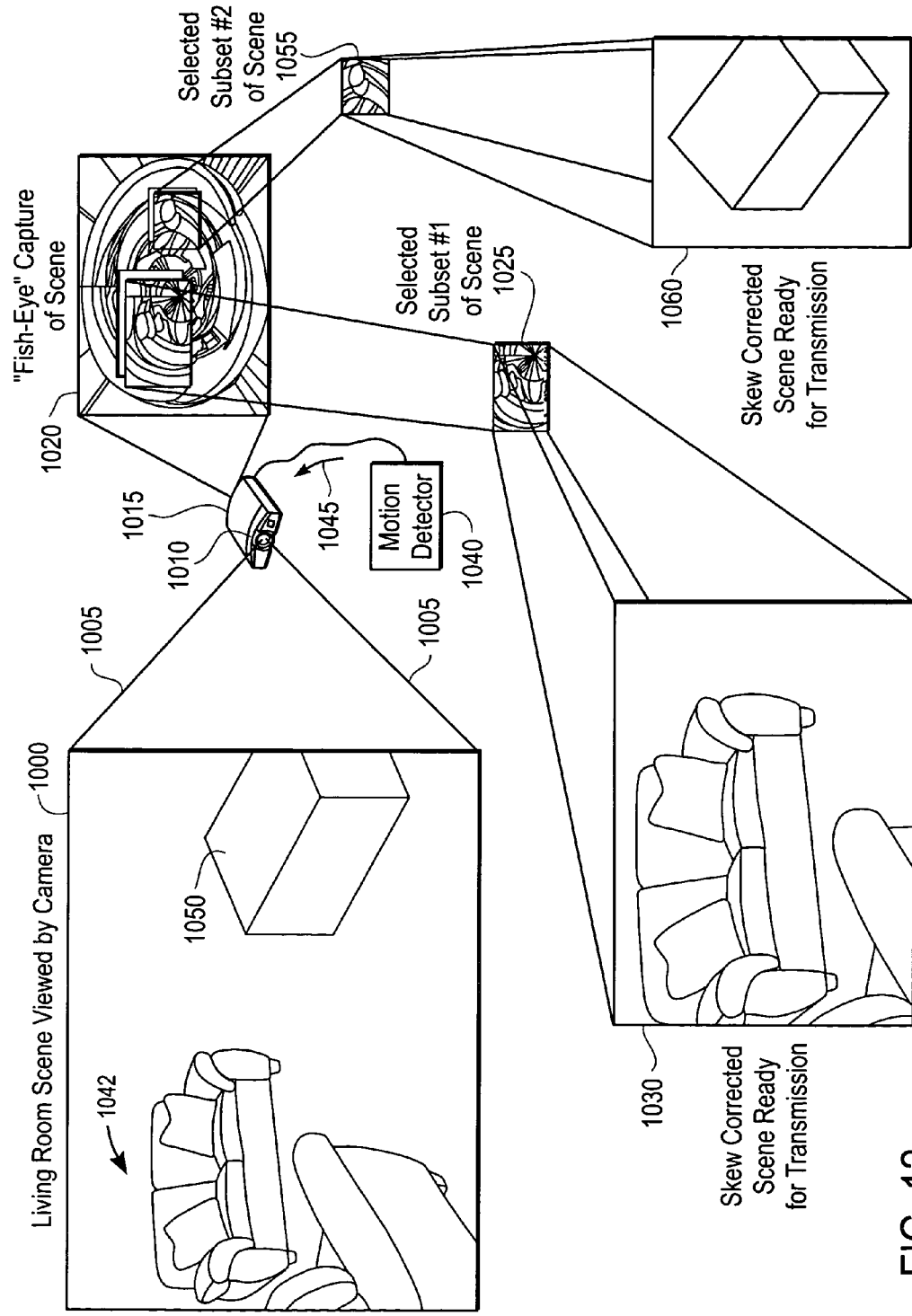
FIG. 12 is a diagram illustrating an operation of an embodiment of the invention.

FIG. 12 is diagram illustrating an operation of another embodiment of the invention. A scene 1000 falls within the vision field 1005 of a wide angle lens 1010 of a camera 1015. The captured scene is digitized and processed into a digitized scene data 1020. A first subset 1025 of the digitized scene data 1020 is selected based on a pan, tilt, and/or zoom command(s) that can be transmitted from an input device by the user. The first subset 1025 corresponds to a scene area with object 1042 that is focused upon by the camera 1015. The selected subset 1025 may be skew corrected (e.g., distortion compensated) into scene data 1030 that can be transmitted to a destination. The scene data 1030 is also typically compressed in order to optimize the data transmission across a network.

A mechanically-based pan/tilt/zoom camera is limited to its focused field of vision when capturing an image. As a result, any movement that occurs outside the focus of the camera is not visible to the camera. The specific embodiment shown in FIG. 12 overcomes this limitation of mechanically-based cameras. A motion detector 1040 can cause the focus of the camera 1015 to change by transmitting commands 1045 to cause the focus of the software-steerable camera 1015 to change. As a result, the software-steerable camera 1015 can change its focus to an area of the field of vision 1005 where movement or activity was detected by the motion detector 1040.

Assume that the motion detector 1015 detects activity outside the scene area of object 1042 and near the scene area of object 1050. As a result, the motion detector 1040 issues a command 1045 so that the software-steerable camera 1015 selects a subset 1055 which corresponds to an area in the scene 1000 with the detected activity. In the specific embodiment of FIG. 12, it is assumed that the elements for permitting the software-based steering functions previously described above (e.g., webcam engine 410, processor for executing webcam engine 410, and so on) are included in the camera 1015. However, it is within the scope of the invention to couple the camera 1015 to a customer premise equipment such as a set top box or companion box, where the software-based steering functions are performed by a processor and/or software in the customer premise equipment. The selected subset 1055 may be skew corrected (e.g., distortion compensated) into scene data 1060 that can be transmitted to a destination. The scene data 1060 is also typically compressed in order to optimize the data transmission across a network.

It is noted that in the examples shown herein, more than two subsets of a digitized scene data may be selected. Thus, for example, other subsets in addition to subsets 1025 and 1055 may be selected in FIG. 12.

Figure 13A:
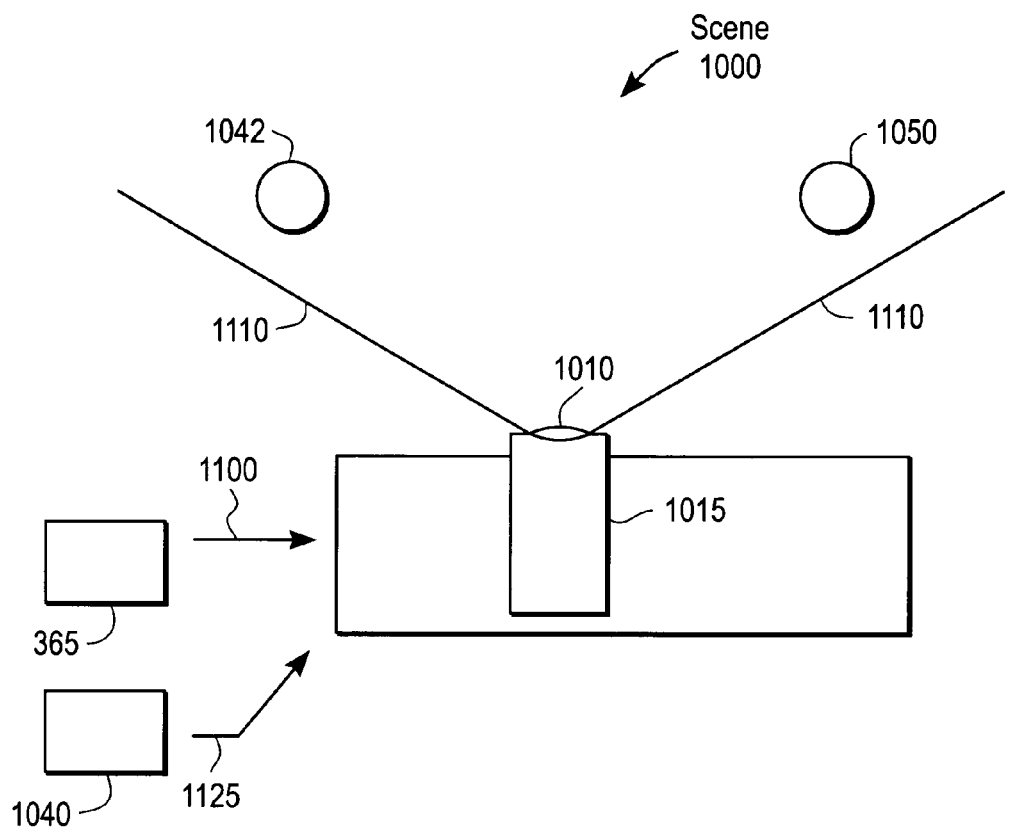
FIG. 13A is an illustrative example block diagram showing a function of the camera of FIG. 12 in response to particular pan, tilt, and/or zoom commands.
Figure 13B:
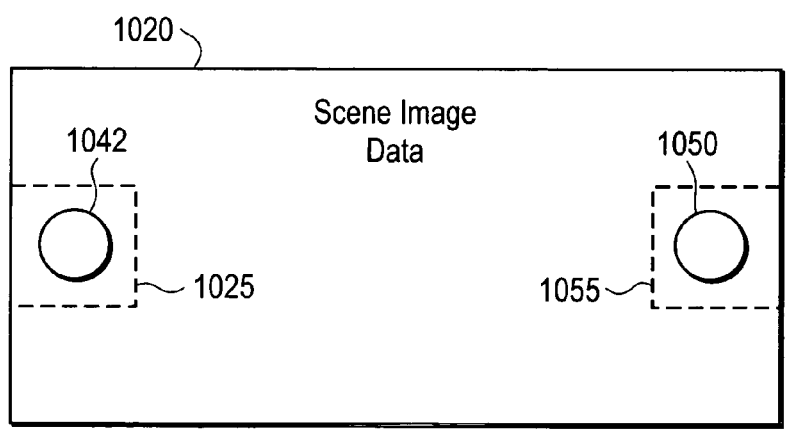
FIG. 13B is an illustrative example block diagram of selected subsets in a digitized scene image data in response to particular pan, tilt, and/or zoom commands.

FIGS. 13A and 13B illustrate an example of another operation of an embodiment of the invention. Assume the user sends a command 1100 (by use of, for example, input device 365) in order to capture an image of the object 1042. It is noted that the user of input device 365 can be local or remote to the camera location in any of the various embodiments described above. Thus, remote access is optionally allowed.

A conventional webcam will require a physical pan movement to the left to capture the image of the object 1042. Assume in this example that the digitized scene image data 1020 of the scene 1000 in the vision field 1110 was captured in the manner similarly described above. The webcam engine 410 receives the pan left command 1100 and accordingly selects an area (subset) 1025 that contains an image of the object 1042 in the digitized scene image data 1020. The compression/correction engine 400 (FIG. 4) can perform distortion compensation to reverse the distortion caused by the wide angle lens 1010 on the captured image of object 1042.

Assume that activity or movement occurs in the vicinity of object 1050. The motion detector 1040 detects the activity and responsively transmits a command (e.g., pan right command) 1125 that is processed by webcam engine 410. In response to the command 1125, webcam engine 410 accordingly selects an area (subset) 1055 that contains an image of the object 1050 in the digitized scene image data 1020.

Figure 14:
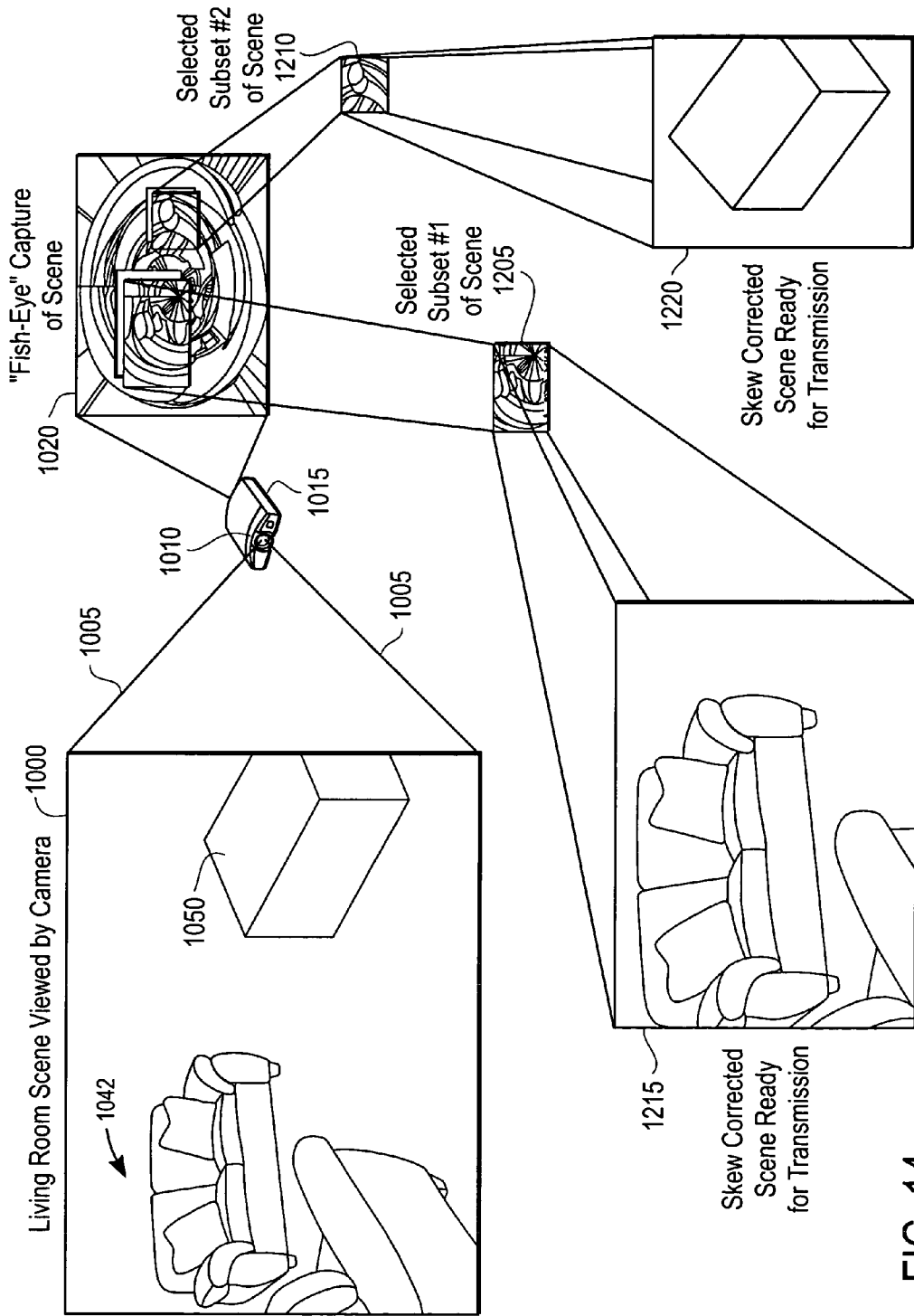
FIG. 14 is a diagram illustrating an operation of another embodiment of the invention.

FIG. 14 shows another specific embodiment where the camera 1015 captures at least two selected areas in the scene 1000. The captured scene 1000 is digitized and processed into a digitized scene data 1020. A first subset 1205 of the digitized scene data 1020 is selected by webcam engine 410 (FIG. 4) based on, for example, a pan, tilt, and/or zoom command(s) that can be transmitted from an input device by the user, while a second subset 1210 in the digitized scene data 1020 is, for example, automatically selected by the webcam engine 410. The first subset 1205 corresponds to a scene area with object 1042 that is focused upon by the camera 1015, while the second subset 1210 may correspond to a scene area outside the scene area associated with first subset 1205. The selected subsets 1205 and 1210 may then be skew corrected (e.g., distortion compensated) into scene data 1215 and 1220, respectively. The scene data 1215 and 1220 may be can be transmitted to a destination.

Figure 15:
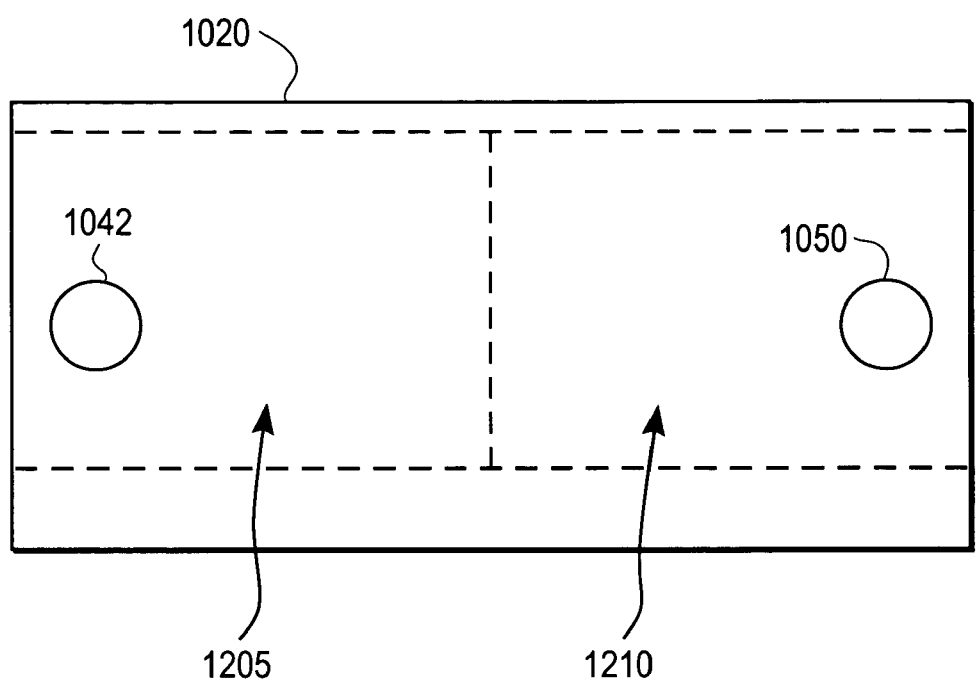
FIG. 15 is an illustrative example block diagram of selected particular subsets a digitized scene image data related to FIG. 14.

As shown in the specific embodiment of FIG. 15, webcam engine 410 (FIG. 4) can select an area (subset) 1205 in the digitized scene image data 1020. In the example of FIG. 15, the selected area 1205 may contain an image of the object 1042. Webcam engine 410 may automatically select a second area that is adjacent or near the first selected area 1205. In the example of FIG. 15, the second area is shown as area (subset) 1210 in the digitized scene image data 1020. The second area 1210 may contain an image of object 1050. It is noted that other areas adjacent to or near first selected area 1205 may also be selected by webcam engine 410 for processing.

Figure 16:
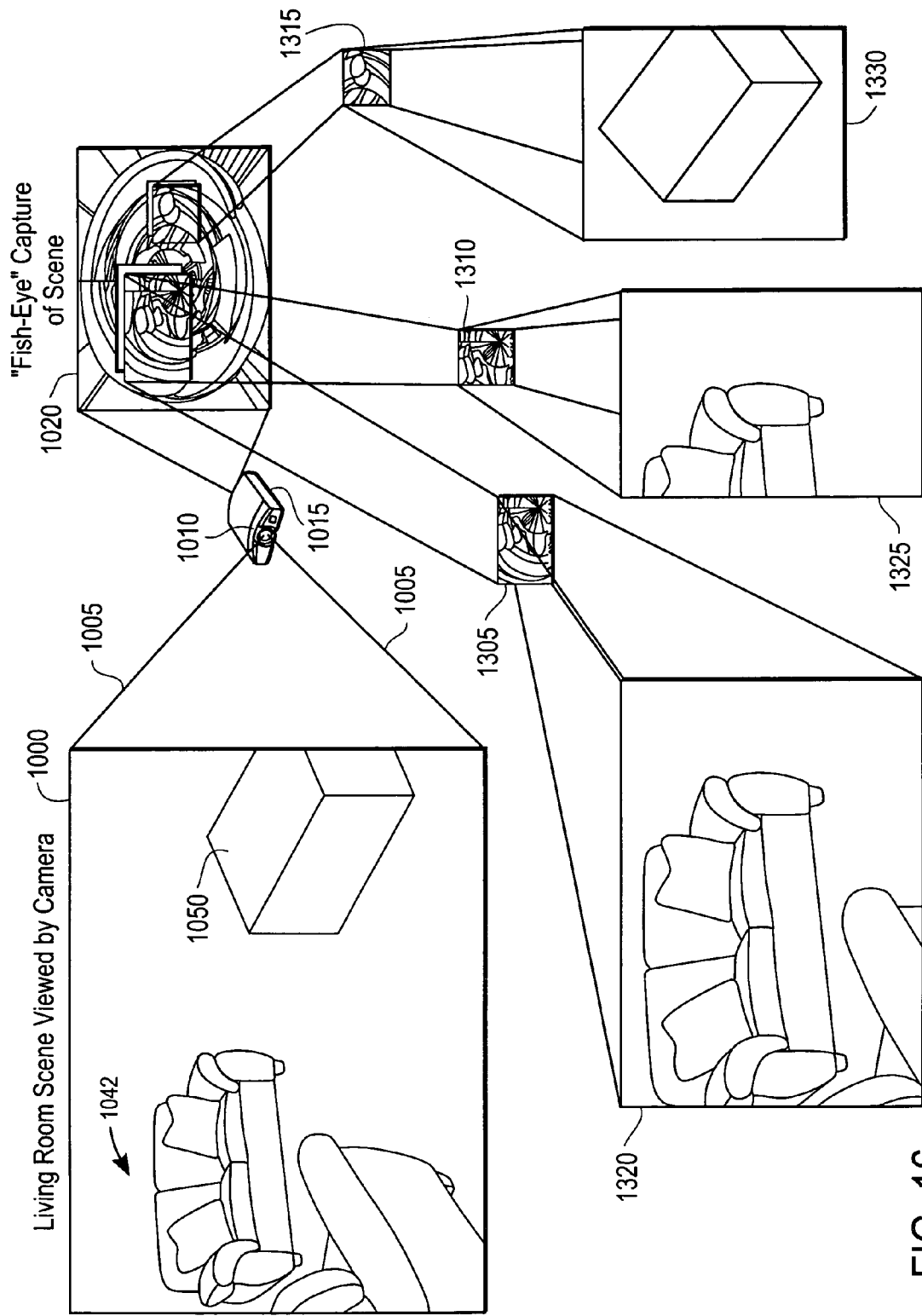
FIG. 16 is a diagram illustrating another operation of an embodiment of the invention where selected image data subsets overlap.

FIG. 16 shows another specific embodiment where the camera 1015 captures at least three selected areas in the scene 1000. The captured scene 1000 is digitized and processed into a digitized scene data 1020. A first subset 1305 of the digitized scene data 1020 is selected by webcam engine 410 based on, for example, a pan, tilt, and/or zoom command(s) that can be transmitted from an input device by the user, while the webcam engine 410 may also select a second subset 1310 in the digitized scene data 1020 where the second subset 1310 may overlap the first subset 1305. The first subset 1305 corresponds to a scene area with object 1042 that is focused upon by the camera 1015. The second subset 1310 also corresponds to a scene area having a portion of object 1042. The third subset 1315 may correspond to a scene area containing, for example, object 1050. The selected subsets 1305, 1310, and 1315 are then typically skew corrected (e.g., distortion compensated) into scene data 1320, 1325, and 1330, respectively. The scene data 1305, 1310, and 1315 may be transmitted to a destination.

Figure 17:
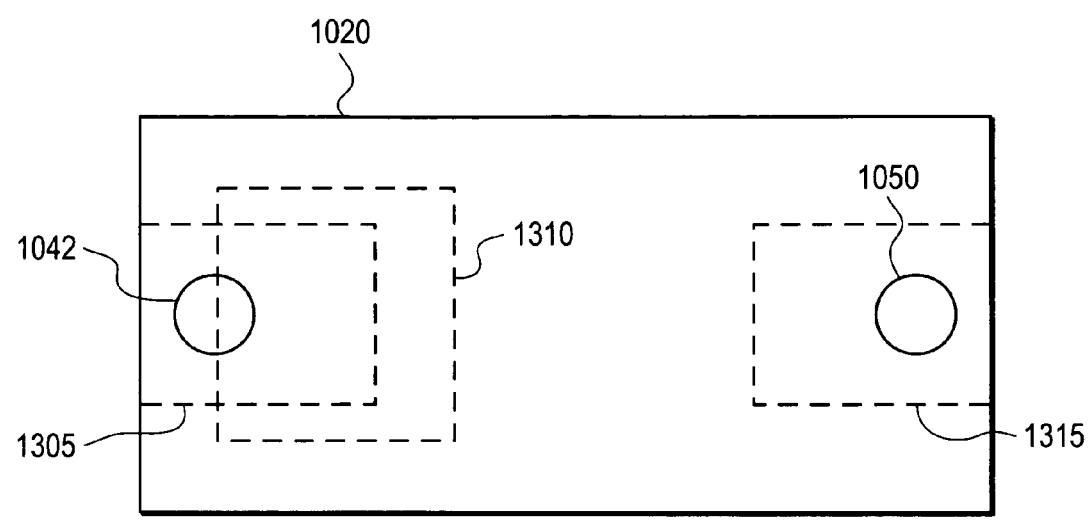
FIG. 17 is an illustrative example block diagram of selected subsets in a digitized scene image data where at least some of the selected subsets overlap.

As shown in the specific embodiment of FIG. 17, webcam engine 410 can select an area (subset) 1305 in the digitized scene image data 1020. In the example of FIG. 17, the selected area 1235 may contain an image of the object 1042. Webcam engine 410 may automatically select a second area that is adjacent or near the first selected area 1305. In the example of FIG. 17, the second area is shown as area (subset) 1310 in the digitized scene image data 1020. The second area 1310 may contain an image of object 1050 and may overlap, for example, the area 1305. It is noted that other areas adjacent to or near first selected area 1305 may also be selected by webcam engine 410 for processing. Additionally, in the example of FIG. 17, the area (subset) 1315 has also been selected for processing.

Figure 18A:
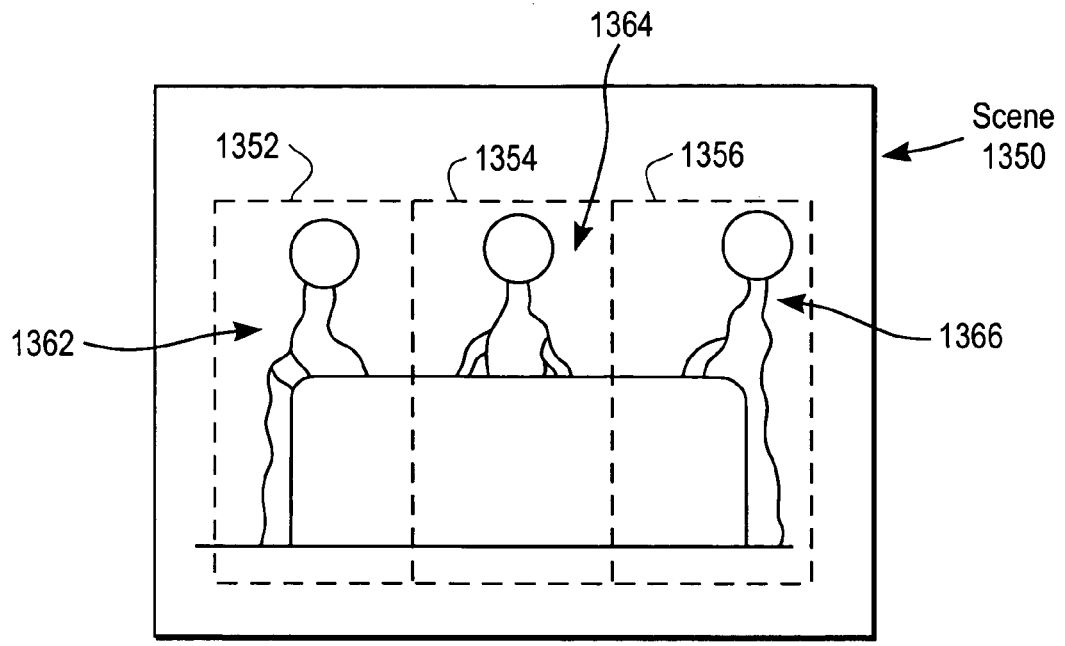
FIG. 18A is a diagram illustrating another operation of an embodiment of the invention.
Figure 18B:
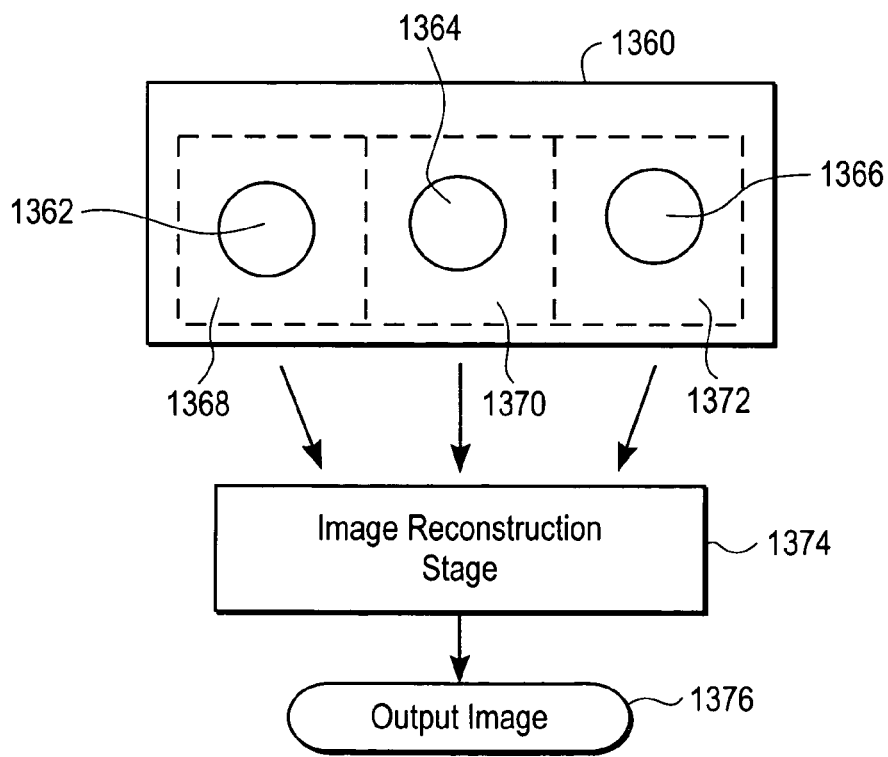
FIG. 18B is an illustrative example block diagram of selected particular subsets a digitized scene image data related to FIG. 18A.

FIG. 18A is a block diagram of another specific embodiment of the invention where the camera 1015 captures a scene 1350. The captured scene 1350 is digitized and processed into a digitized scene data 1360 as shown in FIG. 18B. In this example, three focus areas 1352, 1354, and 1356 in the scene 1350 are shown for purposes of describing an operation of an embodiment of the invention. However, the number of focus areas may also be increased or decreased in various amount. Assume further that objects 1362, 1364, and 1366 are within focus areas 1352, 1354, and 1356, respectively.

A conventional camera can typically only focus on one of the focus areas 1352, 1354, and 1356, and will require movement in order to shift from one focus area (e.g., area 1352) to another focus area (e.g., area 1354). Thus, as an example, in a video conferencing application, the conventional video camera may only be able to focus on the individual within focus area 1352 but not focus on the individuals within focus areas 1354 and 1356 unless the camera is physically steered to the focus area, or unless a second video camera is placed in the room to capture the other focus areas that are not captured by the first video camera.

In contrast, in one embodiment, the camera 1015 can capture focus areas 1352, 1354, and 1356 without requiring movement of the camera 1015. As one example, a first subset 1368 of the digitized scene data 1360 is first selected by webcam engine 410 (FIG. 4), while a second subset 1370 and a third subset 1372 in the digitized scene data 1360 are then selected serially by the webcam engine 410. The first subset 1368 corresponds to the focus area 1352 with object 1362. The second subset 1370 corresponds to the focus area 1354 with object 1364. The third subset 1372 corresponds to the focus area 1356 with object 1366. The selected subsets 1368, 1370, and 1370 may be skew corrected (e.g., distortion compensated) and may be transmitted to a destination.

To serially capture the objects 1362, 1364, and 1366 in focus areas 1352, 1354, and 1356, respectively, the subsets 1368, 1370, and 1372 in digitized scene data 1360 are serially selected or sampled. The subsets 1368, 1370, and 1372 are then reconstructed by use of an image reconstruction stage 1374. The output of the image reconstruction stage 1374 is an output image 1376 which include images of all objects in the captured focus areas 1352, 1354, and 1356 of scene 1350. Thus, this specific embodiment of the invention shown in FIGS. 18A and 18B advantageously permits a wide focus area in a scene to be captured by a single camera, without requiring physical movement of the camera. Additionally, this specific embodiment may permit a single camera to simulate multiple virtual cameras, since images from multiple focus areas can be serially captured and integrated into a single, integrated output image 1376. It is noted, as similarly described below, that the subsets 1368, 1370, and 1372 may be transmitted to a destination device prior to being reconstructed into the single, integrated output image 1376. The transmission of the subsets 1368, 1370, and 1372 may be performed serially.

Figure 19A:
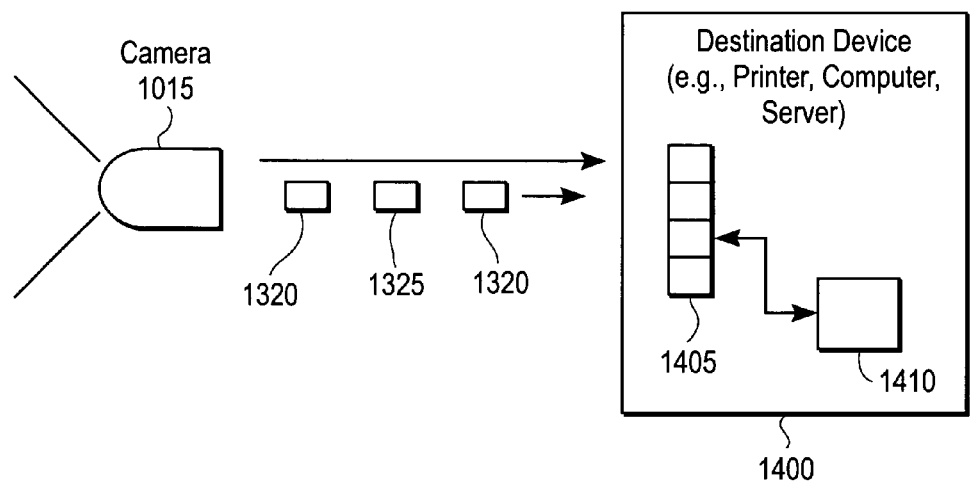
FIG. 19A is a diagram illustrating an operation of an embodiment of the invention where image data subsets are transmitted from a camera to a destination device.
Figure 19B:
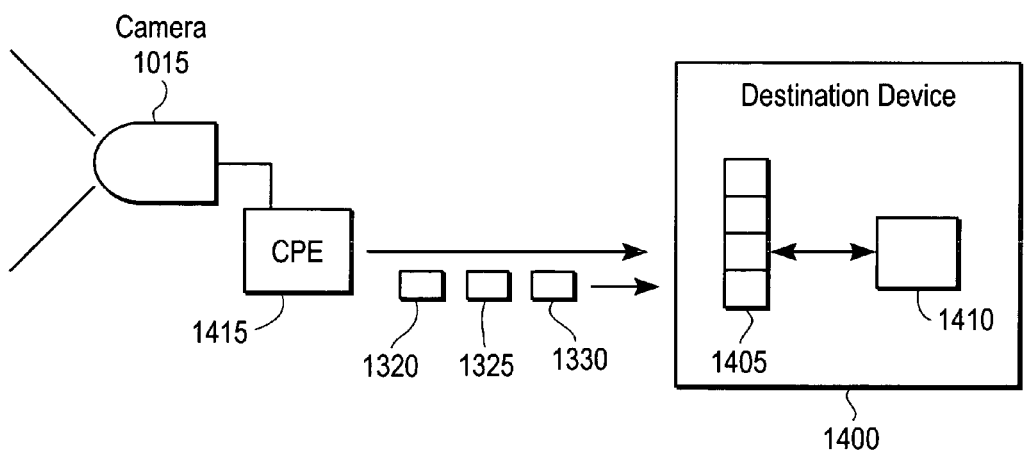
FIG. 19B is a diagram illustrating an operation of an embodiment of the invention where image data subsets are transmitted from a customer premise equipment to a destination device.

FIGS. 19A and 19B are block diagrams showing the transmission of the compensated scene subset data 1320, 1325, and 1330 to a destination device 1400 such as a server, printer, or computer. The advantage of transmitting the composite data 1320, 1325, and 1330 as separate views is in the savings of bandwidth. As shown in FIG. 19A, the composite data 1320, 1325, and 1330 may be processed in and may be transmitted from the camera 1015 to the destination device 1400. The composite data 1320, 1325, and 1330 may be transmitted serially. In FIGS. 19A and 19B, subset data 1320, 1325, and 1330 are shown as examples for describing an operation of a specific embodiment of the invention. Thus, any number of subset data may be transmitted in the operations shown in FIGS. 19A and 19B.

The composite data 1320, 1325, and 1330 may be received and stored in frame buffer(s) 1405, and a processor (or image reconstruction stage) 1410 may be used to reconstruct the composite data 1320, 1325, and 1330 into a single image representing the scene captured by the camera 1015. For purposes of clarity and describing the functionality of an embodiment of the invention, other known components that are used for image reconstruction have been omitted in FIGS. 19A and 19B.

As shown in FIG. 19B, the composite data 1320, 1325, and 1330 may also be processed in a customer premise equipment 1415 (e.g., a set top box or companion box), and the composite data 1320, 1325, and 1330 may be transmitted from the customer premise equipment 1415 to the destination device 1400. As in FIG. 19B, the composite data 1320, 1325, and 1330 may be transmitted serially.

Figure 20:
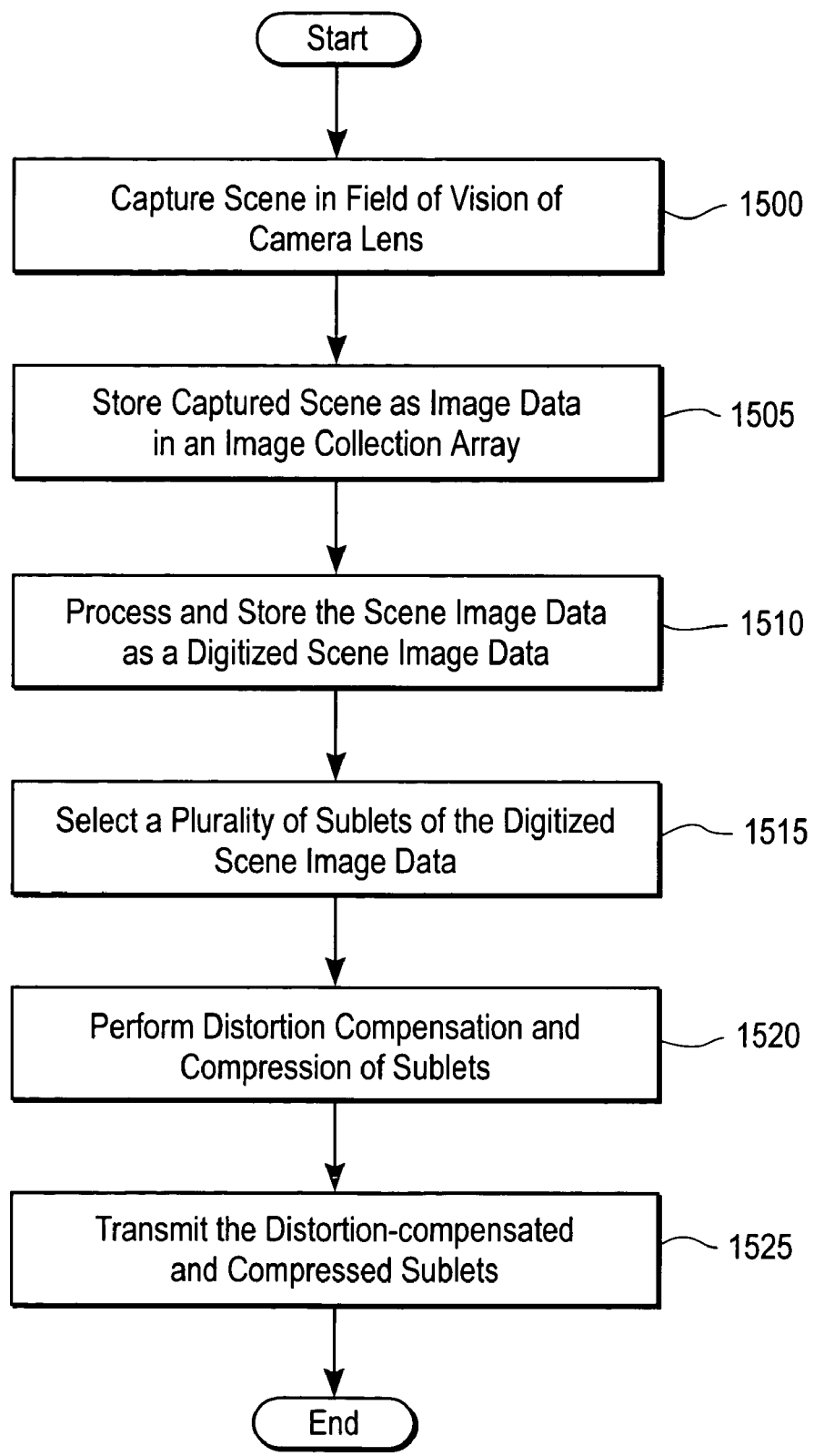
FIG. 20 is a flowchart of a method according to another embodiment of the invention.

FIG. 20 is a flowchart of a method to perform a panning, tilting or zooming function according to another embodiment of the invention. A scene is captured (1500) in the field of vision of a camera lens. The captured scene in the vision field is then stored (1505) as scene image data in an image collection array. The scene image data in the image collection array is then processed and stored (1510) as a digitized scene image data. A plurality of subsets of the digitized scene image data is then selected (1515). For example, a first subset of the digitized scene image data may be selected based on pan/tilt/zoom command(s), while a second subset may be selected based on motion detection techniques. Distortion compensation and compression may then be performed (1520) on the subsets of the digitized scene image data. The distortion-compensated and compressed subset may then be transmitted (1525) to a selected destination such as a destination device.

Other variations and modifications of the above-described embodiments and methods are possible in light of the foregoing teaching. For example, webcam 100 may comprise a processor and perform the selection of the subset of the digitized scene image data and the distortion compensation and compression of the subset instead of STB 140. As another example, the webcam 100 can send the digitized scene image output to a processing device, such as a personal computer instead of the STB 140, and the processing device can select the subset of the digitized scene image data and perform the distortion compensation and compression of the subset.

As another example, the webcam 100 can instead send the digitized scene image output to an optional companion box device 175 (FIG. 1) instead of sending the digitized scene image output to the set top box 140. The companion box 175 may include, for example, the functionality of an Interactive Companion Box, as described in U.S. patent application Ser. No. 09/815,953, filed on Mar. 23, 2001, entitled "Interactive Companion Set Top Box," by inventors Ted M. Tsuchida and James A. Billmaier, the disclosure of which is hereby incorporated by reference. Functions of the Interactive Companion Box may include Internet access, Video-on-Demand, an electronic programming guide, videoconferencing, and/or other functions.

As another example, the sample stage 245 in FIG. 1 may instead perform the selection of the image subset to be compressed and compensated for distortion, instead of the webcam engine 410.

Further, at least some of the components of this invention may be implemented by using a programmed general purpose digital computer, by using application specific integrated circuits or field programmable gate arrays, or by using a network of interconnected components and circuits. Connections may be wired, wireless, by modem, and the like.

It is also within the scope of the present invention to implement a program or code that can be stored in an electronically-readable medium to permit a computer to perform any of the methods described above.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of controlling the capture of an image of an object in a camera field of vision, the method comprising:
    storing, in an image collection army, data of a scene within the field of vision of a wide-angle lens;
    storing, in memory, digitized data of the scene within the field of vision;
    selecting a plurality of subsets of the digitized data of the scene;
    performing distortion compensation on each of the plurality of subsets of the digitized data of the scene to correct for distortion caused by the wide-angle lens; and
    transmitting individually each of the subsets of distortion compensated digitized data to a destination device for simultaneous display thereon.

2. The method of claim 1 wherein the plurality of subsets of the digitized scene image data are selected serially.

3. The method of claim 1 further comprising:
    reconstructing the selected plurality of subsets into an integrated output image.

4. The method of claim 1 wherein a subset corresponds to a focus area in the scene.

5. The method of claim 1 wherein the camera is used to transmit images in a network.

6. The method of claim 1 wherein the camera is communicatively coupled to a first unit that is capable to transmit images in a network.

7. The method of claim 1 wherein the selecting the subsets is controlled by a first unit that is capable to transmit images in a network.

8. The method of claim 1 wherein the camera is communicatively coupled to a companion unit that is capable of being communicatively coupled to a first unit for transmitting images in a network.

9. The method of claim 1 wherein the selecting the subsets is controlled by a companion unit that is capable of being communicatively coupled to a first unit for transmitting images in a network.

10. The method of claim 1 wherein the camera is communicatively coupled to a processing device.

11. The method of claim 1 wherein the selecting the subsets is controlled by a processing device.

12. The method of claim 1, further comprising:
    performing compression on the selected subsets of the digitized data of the scene.

13. The method of claim 1, further comprising:
    simultaneously displaying each of the subsets of the digitized data of the scene on a destination device.

14. The method of claim 1 wherein one of the selected subsets of the digitized scene image data is selected based on detected activity in the scene.

15. The method of claim 1 wherein one of the selected subsets of the digitized scene image data is selected based on a location relative to another one of the selected subsets.

16. The method of claim 1 wherein one of the selected subsets of the digitized scene image data is selected based on a command signal.

17. The method of claim 1 wherein at least two of the selected subsets are overlapping.

18. The method of claim 1 wherein at least two of the selected subsets are non-overlapping.

19. The method of claim 1, further comprising:
    performing distortion compensation on the subsets of the digitized data of the scene.

20. The method of claim 19, wherein the performing distortion compensation is controlled by a first unit that is capable to transmit images in a network.

21. The method of claim 19, wherein the performing distortion compensation is controlled by a companion unit that is capable of being communicatively coupled to a first unit for transmitting images in a network.

22. The method of claim 19, wherein the performing distortion compensation is controlled by a processing device.

* * * * *